US012175523B2

(12) United States Patent  
Srinath et al.

(10) Patent No.: US 12,175,523 B2  
(45) Date of Patent: Dec. 24, 2024

(54) SYSTEM AND METHOD FOR CONTENT INTEGRATED PRODUCT PURCHASING

(71) Applicant: PAYPAL, INC., San Jose, CA (US)

(72) Inventors: Badrinath Venglathur Srinath, Fremont, CA (US); Prabhakar Ramadass, Chennai (IN); Saji Padmaraagam, Chennai (IN)

(73) Assignee: PAYPAL, INC., San Jose, CA (US)

( * ) Notice: Subject to any disclaimer, the term of this patent is extended or adjusted under 35 U.S.C. 154(b) by 1 day.

(21) Appl. No.: 17/509,957

(22) Filed: Oct. 25, 2021

(65) Prior Publication Data

US 2022/0114650 A1 Apr. 14, 2022

Related U.S. Application Data

(63) Continuation of application No. 16/162,252, filed on Oct. 16, 2018, now Pat. No. 11,157,994, which is a  
(Continued)

(51) Int. Cl.  
*G06Q 30/0601* (2023.01)  
*G06F 3/04817* (2022.01)  
(Continued)

(52) U.S. Cl.  
CPC ..... *G06Q 30/0641* (2013.01); *G06F 3/04817* (2013.01); *G06F 3/04842* (2013.01); *G06F 16/955* (2019.01)

(58) Field of Classification Search  
CPC ............ G06F 3/04817; G06F 3/04842; G06F 16/955; G06Q 30/06–0645; G06Q 30/08; G06Q 50/01; G16Y 10/00–90  
See application file for complete search history.

(56) References Cited

U.S. PATENT DOCUMENTS 7,917,840 B2 * 3/2011 Newman ............. G06F 16/9535  
715/208  
7,970,661 B1 * 6/2011 Abraham ........... G06Q 30/0239  
705/26.1  
(Continued)

FOREIGN PATENT DOCUMENTS

CA 2359690 C * 5/2014 ......... G06F 16/9562  
CA 2591686 C * 8/2014 ......... G06F 17/2235  
(Continued)

OTHER PUBLICATIONS

Dialog., "VigLink Introduces LinkWeaver to Transform Content Monetization", Close-Up Media Inc., Nov. 22, 2011, 2 pages.  
(Continued)

*Primary Examiner* — Adam L Levine  
(74) *Attorney, Agent, or Firm* — Haynes and Boone, LLP (57) ABSTRACT

In a system and method for providing augmented content, embodiments disclose a communication module that receives a product identifier for a product and content including an object. The embodiments also disclose an overlay creation module that creates a user interface with a first actuatable element, the first actuatable element being configured to send product purchase instructions to a merchant server when actuated. The embodiments also disclose a product matching module that matches the object to the product identifier and an augmentation module that, in response to the product matching module matching the object to the product identifier, creates an augmented content which includes the content and a second actuatable element, the second actuatable element being configured to display the user interface as an overlay over the content on a user device when actuated. The embodiments also disclose a displaying module that instructs a user device to display the augmented content.

20 Claims, 7 Drawing Sheets

Related U.S. Application Data continuation of application No. 14/550,586, filed on Nov. 21, 2014, now Pat. No. 10,102,565.

(51) Int. Cl.
*G06F 3/04842* (2022.01)
*G06F 16/955* (2019.01)

(56) References Cited

U.S. PATENT DOCUMENTS

| | | | |
|---|---|---|---|
| 8,255,293 | B1 | 8/2012 | Davies |
| 8,682,739 | B1* | 3/2014 | Feinstein ............ G06Q 30/0641 |
| | | | 705/26.1 |
| 8,914,736 | B2 | 12/2014 | Cardasco |
| 9,674,259 | B1* | 6/2017 | Venkatasubramanian .................... |
| | | | H04L 67/02 |
| 9,836,774 | B2 | 12/2017 | Kirovski et al. |
| 10,824,987 | B2* | 11/2020 | Kliper ...................... G06N 7/01 |
| 2002/0143659 | A1 | 10/2002 | Keezer et al. |
| 2005/0192873 | A1 | 9/2005 | Roche et al. |
| 2007/0282695 | A1 | 12/2007 | Toper et al. |
| 2009/0171739 | A1* | 7/2009 | De ...................... G06Q 30/0601 |
| | | | 705/26.1 |
| 2010/0023493 | A1 | 1/2010 | Douglis et al. |
| 2010/0153831 | A1 | 6/2010 | Beaton |
| 2010/0241497 | A1 | 9/2010 | Rittman et al. |
| 2011/0124375 | A1 | 5/2011 | Stuivenwold |
| 2011/0145068 | A1* | 6/2011 | King ...................... G06F 16/435 |
| | | | 348/222.1 |
| 2011/0225181 | A1 | 9/2011 | Kubicki et al. |
| 2012/0084811 | A1 | 4/2012 | Thompson et al. |
| 2012/0095881 | A1* | 4/2012 | Rothman ............ G06Q 30/0643 |
| | | | 705/27.2 |
| 2012/0296718 | A1* | 11/2012 | Kennedy ................ G06Q 30/06 |
| | | | 705/14.16 |
| 2013/0110670 | A1* | 5/2013 | Webber .................. H04L 63/102 |
| | | | 707/769 |
| 2013/0138477 | A1 | 5/2013 | Wilkins et al. |
| 2013/0332318 | A1 | 12/2013 | D'Auria et al. |
| 2014/0207659 | A1 | 7/2014 | Erez et al. |
| 2014/0229467 | A1 | 8/2014 | Roseman et al. |
| 2014/0229857 | A1* | 8/2014 | Haugen ................... H04L 67/53 |
| | | | 715/753 |
| 2014/0279068 | A1* | 9/2014 | Systrom ............. G06Q 30/0269 |
| | | | 705/14.73 |
| 2015/0286349 | A1 | 10/2015 | Kaufthal |

FOREIGN PATENT DOCUMENTS

| | | |
|---|---|---|
| JP | 2013501976 A | 1/2013 |
| WO | 0041067 A1 | 7/2000 |

OTHER PUBLICATIONS

International Appl. No. PCT/US2015/061431, International Search Report mailed on Feb. 3, 2016, 2 pages.
International Appl. No. PCT/US2015/061431, Written Opinion mailed on Feb. 3, 2016, 6 pages.
Qin Z., "Introduction to E-Commerce", Tsinghua University, Springer, 2009, 527 pages.
Simon B., "PayPal Link Generator-Build Your Own 1 Click Payment Links", Retrieved from Internet URL: http://www.blogbyben.com/2009/04/paypal-link-generator-build-your-own-1.html, Retrieved on Apr. 21, 2009, 1 page.

* cited by examiner

SYSTEM AND METHOD FOR CONTENT INTEGRATED PRODUCT PURCHASING

CROSS REFERENCE TO RELATED APPLICATIONS

This application is a continuation of U.S. patent application Ser. No. 16/162,252 filed Oct. 16, 2018, which is a continuation of U.S. patent application Ser. No. 14/550,586, filed Nov. 21, 2014, issued on Oct. 16, 2018 as U.S. Pat. No. 10,102,565; which are incorporated herein by reference in their entireties.

BACKGROUND

Field of the Invention

The present invention generally relates to electronic commerce and, more particularly, to systems and methods for facilitating online purchasing and payments by integrating product advertisement and purchasing abilities within content a user is viewing.

Related Art

Computer systems and networks can facilitate the tasks of buying, selling and transferring goods and services in retail and other marketplaces. For example, a consumer can pay for an item from either an online merchant or at a point of sale of a brick-and-mortar store through the use of a payment provider that can be accessed on his or her smart phone, tablet, laptop computer, desktop computer, or other personal mobile or desktop device. In particular, users of a payment provider can use the payment provider website or a payment provider application or "app" on a mobile device to make payments to various online or offline merchants.

Oftentimes the payment system, the purchasing system, and the advertisement system are all disconnected, causing an inefficient purchasing process for an individual or user. For example, a user may be reading an article comparing two different products, one of which the user plans to purchase. Once the user has decided which product to purchase, the user must search for a marketplace or merchant that sells the product. Once a merchant has been chosen, the user will often have to decide on how the user plans to pay for the product, such as through a payment provider, entering a credit card, and so on. This is quite a cumbersome process.

Sometimes, the user may be browsing content and see an image of a product that the user wants to buy. The user may be unable to identify the product and may have to conduct a search for the product. After identifying the product, the user may have to go through the purchasing process discussed above, distracting the user from the content the user was consuming.

Furthermore, some content providers may want to attract sponsors or be paid for products they advertise or discuss in their content. In the current modes of advertising, the user must include awkwardly placed ads (usually in a column next to the content provider's content) and/or popup ads that distract a user from the content. These ads hurt the user experience by cluttering the content providing medium. These types of ads negatively affect the content provider by deterring users from returning to consume more content.

Therefore, a system and method for un-intrusively inserting ads and product purchasing options within content such that users are uninterrupted or minimally interrupted from viewing the content are highly desirable.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Devices, systems, and methods are provided for performing activities related to online transactions. Included in this disclosure are devices, systems, and methods which may be used for integrating product purchasing abilities within content a user is browsing on a device. In some embodiments, content which a user is viewing through a user device, such as a personal computer, smartphone, and or the like, is augmented to include tags, links, and/or other actuatable elements that allow the user to purchase a product that is referenced by the content without interrupting the user from viewing the content. In various particular embodiments, the devices, systems, and methods can involve one or more devices in communication over a network. Such devices, systems, and methods can facilitate the execution of online transactions partially or completely. According to an embodiment, images, audio links, and/or any other object that can be displayed on the user device may be augmented to seamlessly and/or un-intrusively indicate and/or provide an option to purchase a product related to the object.

Augmenting an object may include replacing, editing, updating, modifying, placing an overlay over the object, and/or the like.

In some embodiments, the actuatable element, when activated, may display an overlay which provides the user with one or more items for purchase with one or more payment options. Actuatable elements may be a link, an audio command, an element activated by a gesture, a hover over element, and/or the like. In some examples, when a user is using the user device to browse a website, the device, through a native application and/or a remote application, may identify text related to a product for sale and augment the text into a link for purchasing the product. In some embodiments, third-party content providers may insert a script, code, and/or the like into their website which causes the content to be augmented when viewed by a user. The script, code, and/or the like, may be generated by an application when a merchant creates a product page in an online marketplace. In some embodiments, the script, code, and/or the like may be tailored to the merchant's product page, and the script, code, and/or the like may be distributed by the merchant. In some embodiments, the script, code, and/or the like may be tailored to multiple merchants.

In some examples, an application may also identify images, audio signals, video, and/or the like related to a product for sale within content viewed by a user and augment the content to include links and/or other actuatable elements which allow the user to purchase one or more products with one or more payments systems.

In some embodiments, there may be multiple merchants that sell a product, and when content is augmented to include an actuatable element to purchase the product, the actuatable element may feature a merchant based on several factors. In some examples, the factors may be determined by a user's preferences. In some embodiments the factors may be based on or a combination of user/account information, price, time of delivery, user ratings, past purchases, location, time of day, and/or the like. In some embodiments, users may be provided with the option of multiple merchants to purchase a product from.

In some embodiments, the actuatable elements may be tailored to a single merchant, and the actuatable elements in the augment content may map product purchases to that single merchant.

In some embodiments, links may be created that directly link to products on a merchant page for sale. The actuation of a link may display an overlay for direct sale of a product without interrupting the user from viewing the content. In some embodiments, merchants may be able to distribute this link to third-party content creators to advertise their products.

In some embodiments, one or more applications located natively on the user's device and/or remotely from the user's device identify text, pictures, video, audio signals, and/or the like within the content that is related to a product sold by one or more merchants. In some embodiments the identified text may be a product name, trademark, trade name, company name, product description, and/or the like. The identified text may be pictures of the product, product advertisement pictures, and/or other pictures related to the product. Similarly, the identified media, such as video and/or audio signals, may be related to a product for purchase, rent, and/or license. This may include movies, music, radio recordings, podcast recordings, audiobooks, and/or the like.

The text, pictures, video, audio signals, and/or other mediums may be identified with a product by matching it with a database of text, images, video, audio signals, and/or other mediums that are mapped to a product sold, rented, and/or licensed by a merchant. In some embodiments, the database of text, images, video, audio signals, and/or other medium that are mapped to a product may be provided by merchants. Merchants may provide the database entries as part of a product description.

In some embodiments, the content augmentation application(s) and/or plugins may augment content viewed by a user to indicate that products referenced in the content may be purchased by the user. In some embodiments, the content is augmented so that the words that match a product description and/or key word are turned into a link and/or an actuatable element. In some embodiments, actuatable elements, such as a virtual button, is displayed near a picture, video, media player, text, and/or other objects within the content. In some embodiments, the actuatable element may appear as part of or near the toolbar of a web browser. In some embodiment, the actuatable element may be displayed at the top and/or bottom of the content page and/or top and/or bottom of the current viewable portion of the content.

In some embodiments, one or more servers may provide an application to a website publisher which allows the website publisher to run the application over their content before publishing it on their website. The application may embed actuatable elements into the content such that the website publishes content embedded with the actuatable elements discussed above. In this manner, an augmentation plugin and/or application does not need to be natively held on the user's device for a user to view augmented content.

In some embodiments, when a user actuates one or more actuatable elements, an overlay may be displayed over the content which allows the user to purchase a product. In some embodiments, there may be several merchants who sell the product and the overlay will display the product from a merchant closest to the user's mailing address. In another embodiment, the overlay may display the product from the merchant with the cheapest price, which may include shipping costs. In some embodiments, the overlay may pick merchants for display based on one or more factors which may be based on one or more user preferences. The factors may include, but are not limited to, price, rating, purchase history, recent activity, address, marketplace, payment methods, and/or the like. In some embodiments, the user may choose from one of several merchants displayed in the overlay.

The actuatable elements discussed above may be activated in one or more manners to display an overlay. In some examples, the actuatable elements may be a hyperlink that may be activated by clicking on the hyperlink through an input device such as a mouse and/or a touch screen. In some embodiments, the actuatable element may be activated by a gesture, such as circling the actuatable element with a curser.

In some embodiments, the overlay may have one or more actuatable elements which allow for the user to purchase a product. In some embodiments, the user may choose to use an online payment provider to purchase a product. In some embodiments, the user may enter payment information, such as a payment card number. In some embodiments, the overlay may allow the user to insert a coupon code and/or a gift certificate that can be applied to the product. In some embodiments, when a user provides a purchase indication, an online payment provider will automatically be chosen for purchasing the product. In some embodiments, once the product is purchased, the overlay may disappear such that the user may continue consuming the content. In some embodiments, when a product is purchased, the portions of the content that have been augmented for that product may revert to the original state of the content. In some examples, reverting to the original state may be removing one or more actuatable elements, and or removing accentuations to one or more portions of the content.

While the various examples disclosed herein focus on particular aspects regarding the online transactions, it will be understood that the various inventive principles and embodiments disclosed herein can be applied to other types of transactions and arrangements as well. For example, a physical location for products, such as a show room, may utilize one or more of the aspects and features found in the various systems and methods provided.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium can have computer readable and executable code for instructing one or more processors to perform any of the methods disclosed herein.

Figure 1:
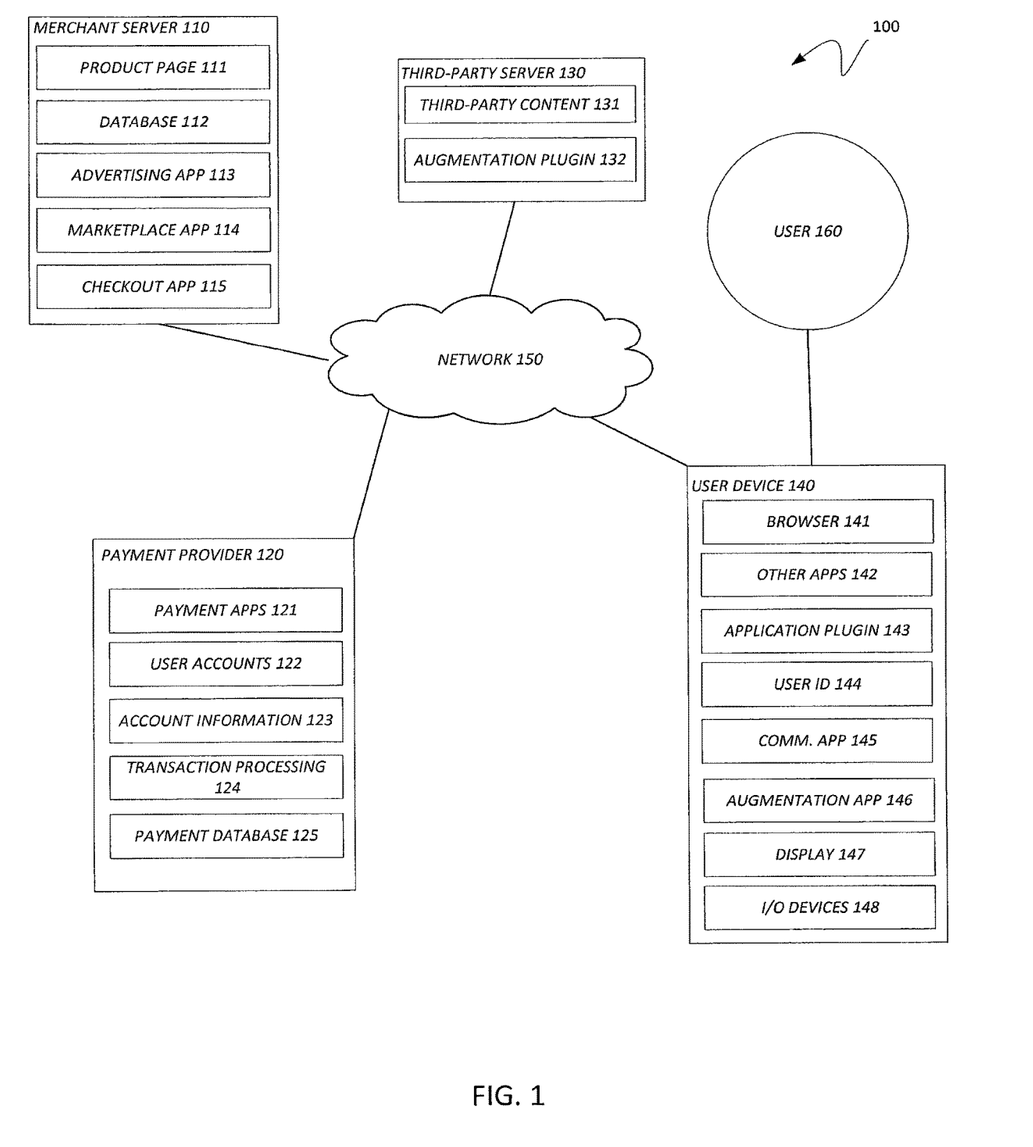
FIG. 1 is a block diagram of an illustrative networked system suitable for implementing a process for facilitating product placement, purchases, and/or payment by augmenting content for display on a user device according to some embodiments.

Beginning with FIG. 1, a block diagram is shown of a networked system 100 suitable for implementing a process for facilitating product placement, purchases, and/or payment by augmenting content for display on a user device according to an embodiment. Networked system 100 may comprise or implement a plurality of servers and/or software components that operate to perform various electronic commerce transactions or processes such as payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a merchant server 110, a payment provider server 120, a third-party server 130, and a user device 140 in communication over a network 150. A user 160, such as a merchant and/or a consumer, may utilize device 140 to interact with other devices such as, merchant server 110, payment provider server 120, and/or third-party server 130.

Merchant server 110 may be maintained, for example, by a merchant, seller, or a marketplace offering various products and/or services. Merchant server 110 may be a marketplace where merchants may set up merchant accounts and a product page 111 for advertising goods and/or services for sale and/or exchange. Merchants may also link their product page 111 with a payment provider, such as payment provider server 120, to conduct currency exchanges when a product is purchased. Generally, merchant server 110 may be maintained by anyone or any entity that receives money, which includes charities as well as banks and retailers. For example, product page 111 may be a donation page where a payment may be a donation to a charity or a deposit to a bank account such as a savings account. In some embodiments, merchant server 110 may be used for point-of-sale (POS) and/or online purchases and transactions. In some embodiments, merchant server 110 may be maintained by a marketplace, which allows multiple merchants to set up a product page 111 to exchange goods and/or services.

Merchant server 110 may have a database 112 which may include merchant accounts and/or user accounts. Database 112 may maintain an inventory of products on product page 111 available for sale, donation, exchange, and/or the like by one or more merchants. Products may include, but are not limited to, physical goods, digital goods, services, commodities, charities and/or the like (products may also be referred to as items). Product page 111 may allow user 160 to view and purchase and/or provide monetary funds, goods and/or services for products on product page 111 with user device 140.

Database 112 may contain product descriptions which may include textual descriptions of products, textual key words, images, videos, audio clips and/or other mediums displaying, advertising, showing off, and/or describing a product.

In some embodiments, merchant server 110 may have an advertising application 113. Advertising application 113 may scan product descriptions provided by a merchant for text, images, videos, and/or information that are uniquely related to a product on product page 111. This may include product names, keywords related to the product, product images, videos of product infomercials, videos of product commercials, sound bites related to the product, product reviews, and/or other objects that identify the product (collectively referred to as product identifiers). In some examples, advertising application 113 may implement a natural language processor (NLP) to scan textual descriptions for textual product identifiers. In some embodiments, product identifiers may be merchant and/or consumer submitted. The product identifiers may also be stored in database 112. In some embodiments, advertising application 113 may provide an application, API, and/or a plugin to one or more devices, such as payment provider server 120, third-party sever 130, and/or user device 140 for accessing the product identifiers over network 160. In some embodiments, advertising application 113 may create overlays and/or actuatable elements, such as links, that are linked and/or mapped to a product on product page 111. In some embodiments, advertising application 113 may create overlays and/or actuatable elements by inserting and/or writing data into empty and/or predetermined data fields of one or more preprogrammed programming file, such as a file for java script, python, html, XML, and/or the like. This may be a ".txt" file and/or the like. In some embodiments the overlay and or actuatable elements may provide a user interface for display on a device such as device 140 for purchasing a product on product page 111. In some embodiments, advertising application 113 may augment content received from one or more devices to contain overlays and/or actuatable elements. In some embodiments, advertising application 113 may search for objects within content received from one or more devices that matches a product identifier and augments the content such that an actuatable element replaces, overlays, surrounds, or is placed proximally to objects that match one or more product identifiers. For example, the content may be displayed through html code, and advertising application 113 may augment the html code. In some embodiments, advertising application 113 may provide code, such as html and or java script code, that when entered into a html file and rendered by a web browser, may result in the display of an actuatable element in the browser. In some embodiments, the actuatable element, when actuated, may display an overlay.

Merchant server 110 also may include a marketplace application 114 which may be configured to serve information over network 150 in order to view and/or purchase various products advertised on product page 111 by a device such as user device 140. Merchant server 110 also may include a checkout application 115 which may be configured to facilitate the purchase by user 160 of goods or services online. Checkout application 115 may be configured to accept payment information from or on behalf of user 160 through payment service provider server 120 over network 150. For example, checkout application 115 may receive and process a payment confirmation from payment provider server 120, as well as transmit transaction information to the payment provider and receive information from the payment provider (e.g., a transaction ID). Checkout application 115 may also be configured to receive payment via a plurality of payment methods including cash, credit cards, debit cards, checks, money orders, or the like.

Payment provider server 120 may be maintained, for example, by an online payment service provider which may provide payment between user 160 and the operator of merchant server 110, another user, and or a merchant. Payment provider server 120 may include one or more payment applications 121 which may be configured to interact with merchant server 110 and/or user device 140 over network 150 to facilitate the purchase of goods and/or services, communicate/display information, and send payments by user 160 of user device 140.

Payment provider server 120 may also maintain a plurality of user accounts 122, each of which may include account information 123 associated with consumers, merchants, and funding sources, such as banks and/or credit card companies. For example, account information 123 may include private financial information of users of devices such as account numbers, passwords, device identifiers, user names, phone numbers, credit card information, bank information, place of residence, mailing addresses, shipping locations, and/or other information which may be used to facilitate online transactions by user 160. Payment application 175 may be configured to interact with merchant server 110 on behalf of user 160 during a transaction with checkout application 115 to track and manage purchases made by users and which funding sources are used. Payment application 121 may be configured to determine the existence of and to manage accounts for user 160, as well as create new accounts if necessary. Payment application 121 may be configured to execute one or more payment transactions in response to receiving and/or recognizing a purchase request from user 160, device 140, and/or merchant server 110.

A transaction processing application 124, which may be part of or separate from payment application 121, may be configured to receive information from user device 140 and/or merchant server 110 for processing and storage in a payment database 125. Transaction processing application 124 may include one or more applications for processing payment information from user 160 and/or merchant server 110 using various selected funding instruments. As such, transaction processing application 124 may store details of an order from individual users, including a funding source used, available credit options, and/or the like. Transaction processing application 124 may be configured to execute one or more transactions such as electronic commerce transactions in response to a user purchasing a product through merchant server 110.

Third-party server 130 may be a server that provides third-party content 131 for users, such as user 160, to view through a device, such as user device 140. Third-party content 131 may be content such as digital content including, but not limited to, audio clips, video, text, pictures, games, and/or the like. Third-party content may include news articles, music, movies, television shows, blogs, social media, and/or the like that may be hosted on a website and/or accessed through an application.

Third-party server 130 may include an augmentation plugin 132. Augmentation plugin 132 may augment third-party content 131 to include actuatable elements when displayed on a user device. Augmentation plugin 132 may receive product identifiers from merchant server 110 and may scan third-party content 131 for objects, such as images, text, audio data, videos, and/or the like, that match one or more product identifiers for a product. Augmentation plugin 132 may augment third-party content 131 such that, when the content is viewed by user 160 with user device 140, an actuatable element replaces, overlays, or is placed proximally to objects that match a product identifier. In some embodiments, the actuatable elements, when activated by a user, may provide a user interface for purchasing a product through merchant server 110 using payment provider 120.

A user 160, may utilize user device 140 to browse third-party content 131 on a third-party server 130 or products on a product page 111 of merchant server 110. User 160 may perform a transaction such as an electronic commerce transaction to purchase a product on product page 111 of merchant server 110 which may utilize a payment provider server 120 to conduct payments. Payment provider server 120 may be maintained by a payment service provider, such as PayPal, Inc. of San Jose, CA A user 160 may utilize user device 140 to initiate a payment transaction, receive a transaction approval request, and/or reply to a transaction approval request. Note that transaction, as used herein, refers to any suitable action performed using the user device, including payments, transfer of information, display of information, purchases, sales, online listings, and/or the like.

User device 140, third-party server 130, merchant server 110, and payment provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Network 150 may be implemented as a single network or a combination of multiple networks. For example, in various embodiments, network 150 may include the Internet or one or more intranets, landline networks, wireless networks, and/or other appropriate types of networks.

User device 140 may be implemented using any appropriate hardware and software configured for wired and/or wireless communication over network 150. For example, in one embodiment, user device 140 may be implemented as a personal computer (PC), a smart phone, personal digital assistant (PDA), laptop computer, and/or other types of computing devices capable of transmitting and/or receiving data, such as an iPad™ from Apple™.

User device 140 may include one or more browser applications 141 which may be used, for example, to provide a convenient interface to permit user 160 to browse content available over network 160, such as third-party content 131 provided by third-party server 130. In some examples, browser application 141 may be implemented as a web browser configured to view content and/or information available over the Internet, such as a blog, news article, social media, and/or any other website.

User device 140 may further include other applications 142 as may be desired in particular embodiments to provide desired features to user device 140. For example, other applications 142 may include security applications for implementing client-side security features, programmatic client applications for interfacing with appropriate APIs over network 150, or other types of applications.

Applications 142 may also include applications for browsing content, which may include applications for email, texting, voice, IM, and/or the like. Applications 142 may allow user 160 to send and receive emails, calls, and texts through network 150. Applications 142 may enable user 160 to play games, read digital books, communicate, transfer information, make payments, and/or the like. In some embodiments, applications 142 may include an application for browsing third-party content 131.

User device 140 may also include one or more application plugins 143 which may be used, for example, to augment content, such as third-party content 131, being viewed on user device 140 through browser application 141 and/or other applications 142. In some embodiments, application plugin 143 may augment content user 160 is viewing by adding or inserting actuatable elements which allows user 160 to purchase a product through merchant server 110 using payment provider 120.

User device 140 may include one or more user identifiers 144 which may be implemented, for example, as operating system registry entries, cookies associated with browser application 141, user identifiers associated with hardware of user device 140, and/or other appropriate identifiers, such as used for payment, user, and/or device authentication. In some embodiments, user device 140 may include a communications application 145, with associated interfaces that enables user device 140 to communicate within system 100. In some embodiments, user identifier 144 may be used by a payment service provider to associate user 160 with a particular account maintained by the payment provider.

User device 140 may include an augmentation application 146. Augmentation application 146 may receive product keywords, product information, product images, price information, merchant information and/or other information from merchant server 110 and/or payment provider server 120. Augmentation application 146 may also receive data from other applications 142 and/or browser 141. In some embodiments this may be through application plugin 143. Application plugin 143 may relay content from browser 141 and/or other applications 142 to augmentation application 146. Augmentation application 146 may scan the content for images, text, audio data, videos, and/or the like that matches a product identifier on product page 111 of merchant server 110. In some embodiments, instead of a native application such as augmentation application 146 conducting a scan and match, augmentation application 146 and/or application plugin 143 may relay content to a remote server, such as payment provider 120, third-party server, and/or merchant 140, for another application, such as advertising application 113, to scan and match objects within content to a product identifier and return the matching results.

In some embodiments augmentation application 146 and/or application plugin 143 may augment content viewed on user device 140 to contain actuatable elements that allow user 160 to purchase a product on product page 111 of merchant server 110. User 160 may have the option to purchase products using payment provider 120.

In some embodiments, augmentation application 146 and/or application plugin 143 may be on a remote server, such as merchant sever 110, payment provider 120, and/or third-party server 130 rather than on the user device. In some examples content providing servers, such as third-party server 130, may contain applications and/or plugins, such as augmentation plugin 132 on third-party server 130, to augment the content before displaying the content on user device 140.

In some embodiments, advertising application 113 on merchant server 110 may aid application plugin 143 and/or augmentation application 146 in augmenting content being viewed by user 160. Application plugin 143 and/or augmentation application 146 may relay content to advertising application 113 over network 150 to identify objects within the content that match a product identifier and provide application plugin 143 and/or augmentation application 146 with actuatable elements that, when activated by the user, link to a product purchasing page. In some embodiment the product purchasing page may be an overlay that is displayed over the content.

Display 147 may include a screen that displays information and/or content to user 160. Display 147 may be a mobile device display, monitor, projection display that projects images onto a transparent, partially transparent or opaque structure, or may include any other suitable display technologies. User device 140 may include one or more input/output devices 148 (e.g., a keypad, a keyboard, a touch sensitive component, a microphone, a camera, and the like). In some examples, display 147 may be a touch screen that doubles as one of the input/output devices 148. User device 140 may monitor user input on the touch screen, on any other touch-sensitive device (e.g., a touchpad on a laptop), and/or other input components (e.g., a mouse) and may recognize user input for association with transactions, and/or to activate actuatable elements for certain functions (e.g., purchase transactions, payment transactions, sales transactions, and listing transactions).

In some examples, user device 140 may have a touch screen display for user 160 to view content that has been augmented and may be able to actuate actuatable elements, such as a link, by touching the touch screen. In some embodiments, an actuatable element may require a touch pattern/gesture, such as circling an actuatable element, for actuation. By actuating the element, user device 140 may prompt user 160 with a user interface that allows user 160 to purchase a product on product page 111. In some embodiments, the actuatable elements, when activated by a user, may cause user device to send a purchase request to merchant server 110 and/or payment provider 120.

One or more of merchant server 110, payment provider server 120, third-party server 130, and user device 140 may be used to execute any suitable transaction in response to user 160 indicating the purchase of a product on product page 111.

As discussed above in FIG. 1, content being viewed on a user device can be augmented in many methods. Additionally, the one or more applications and/or plugins for augmenting content may be distributed over one or more devices such as merchant server 110, payment provider 120, third-party server 130, and/or user device 140. In some embodiments, content being viewed on user device 140 may be relayed to merchant server 110 for augmentation before being displayed on display 147. In some embodiments, the content providing server, such as third-party server 130, may augment content before it reaches user device 140 for viewing by user 160. In some embodiments, the content providing server, such as third-party server 130, may relay content to another server, such as server 110, for augmentation before providing content to a user device for viewing. One of ordinary skill in the art will recognize that even though FIG. 1 illustrates merchant server 110, third-party server 130, and user device 140 having applications for augmenting content, these applications may be consolidated to reside solely on one device, two devices, and/or distributed over all devices, including payment provider 120. In some embodiments, some and/or all of the applications may be distributed over one or more additional devices (not shown).

Figure 2:
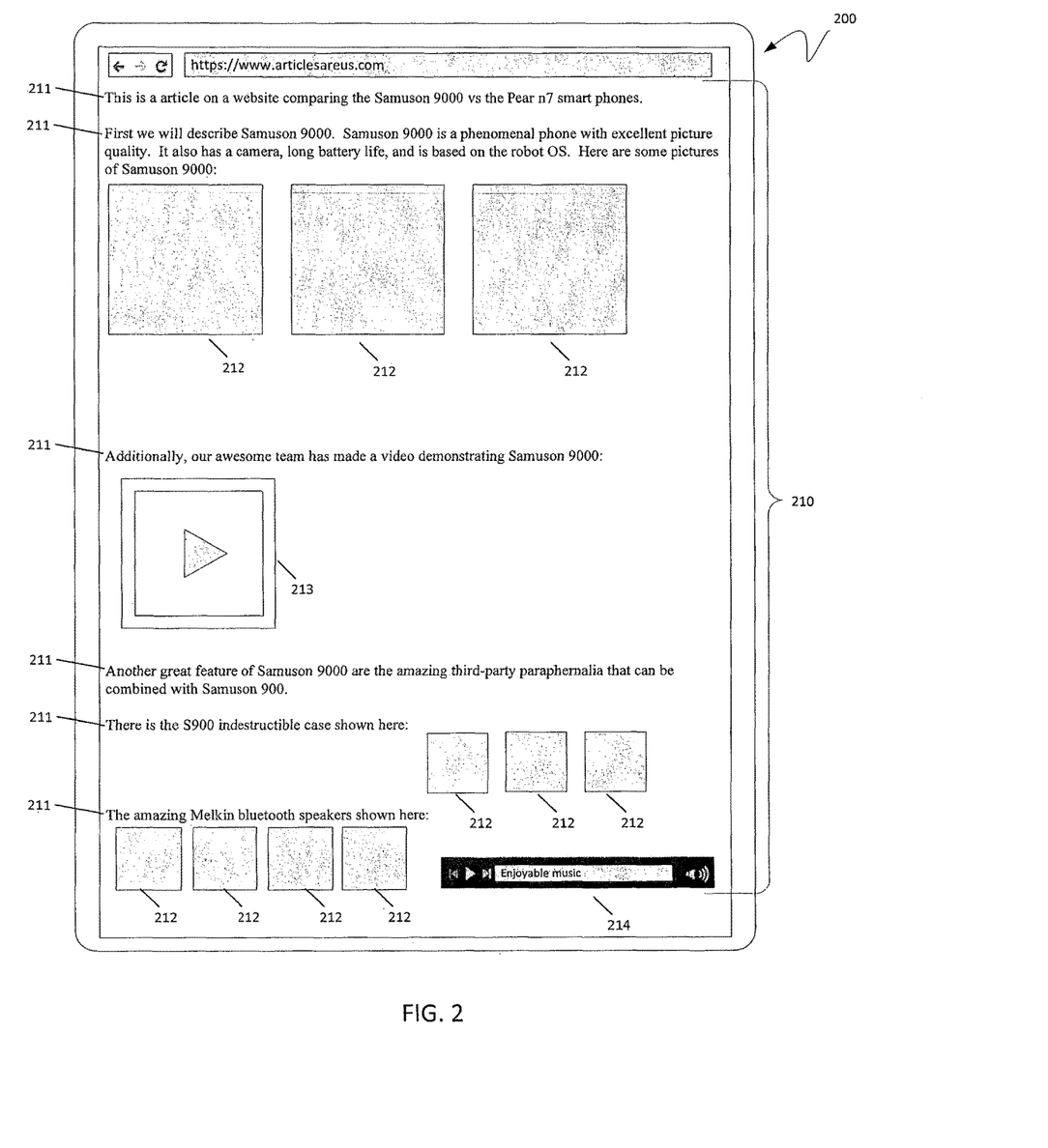
FIG. 2 illustrates an exemplary content on a user device that may be be augmented according to an embodiment.

FIG. 2 shows an exemplary device 200 displaying exemplary content 210. Exemplary device 200 may be user device 140 of FIG. 1. Content 210 may be a blog, article, forum, social media posts, and/or any other information on a webpage hosted on a website. In some embodiments content 210 may be a book, movie, podcast, application, music, radio, and/or the like. Though content 210 in this example is provided through a visual medium, content 210 may also be provided through other modalities, such as audio.

Content 210 may provide text 211. Text 211 may discuss or refer to one or more products that may be on sale by one or more merchants and can be purchased from one or more merchants through a merchant server, such as merchant server 110 of FIG. 1. Content 210 may include one or more images 212. Images 212 may include one or more images of one or more products that may be on sale by one or more merchants. Content 210 may include video 213 and or play audio that is controlled by user interface element 214.

Video 213 may be a video including one or more products and/or about one or more products that may be on sale by one or more merchants. In some embodiments, the video 213 may play media that may be sold, available for rent, and/or available for licensing from one or more merchants.

User interface element 214 may control music, a podcast, and/or any other audio media that content 210 plays through a speaker (not shown) on device 200. The audio media may be available for purchase, licensing, and/or the like from one or more merchants.

Figure 3:
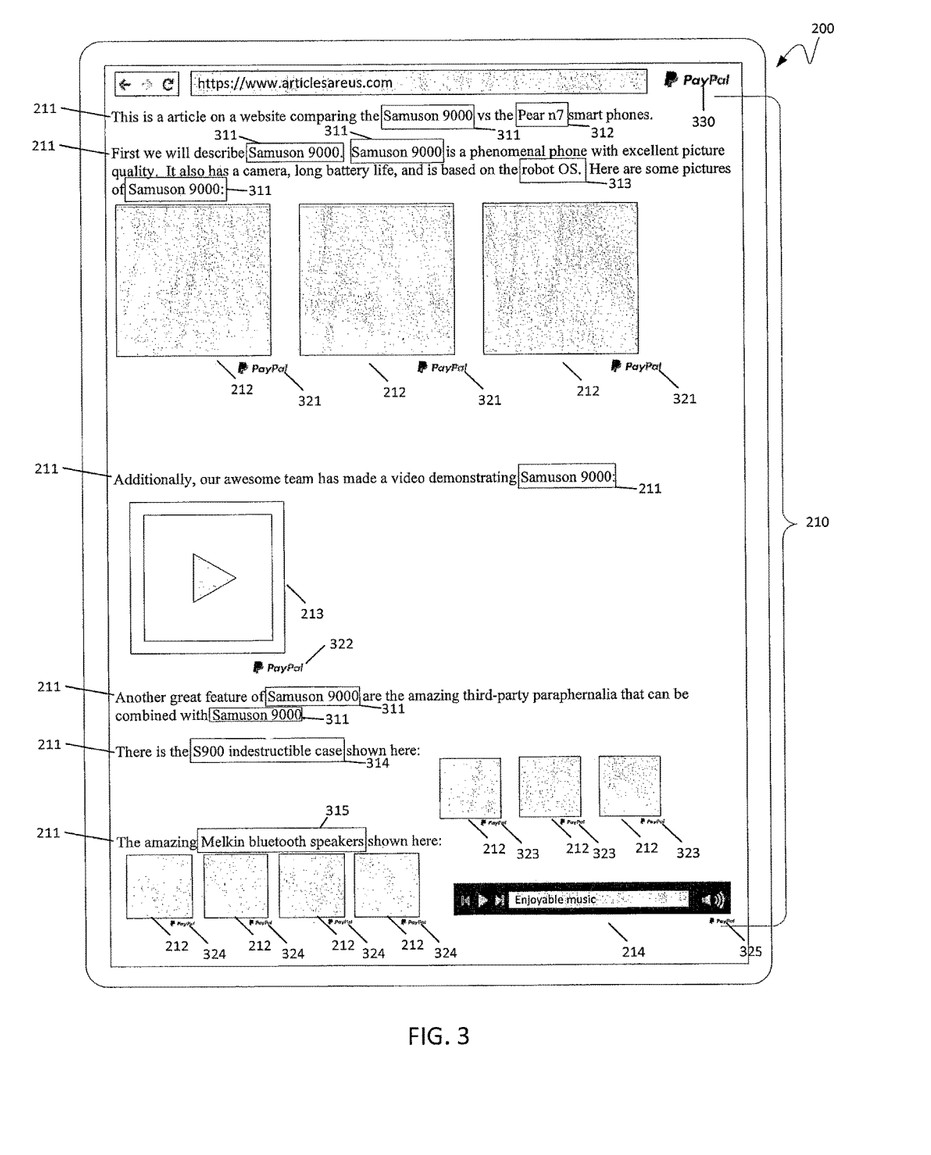
FIG. 3 illustrates the content of FIG. 2 which has been augmented to include actuatable elements according to an embodiment.

FIG. 3 is an exemplary illustration of device 200 and content 210 where content 210 may have been augmented by one or more applications consistent with this disclosure, such as augmentation plugin 132, application plugin 143, and/or augmentation application 146, of FIG. 1.

Content 210 may be augmented such that some of the text, such as text matching product identifiers to products on product page 111 of FIG. 1, may be turned into actuatable elements 311-315. Content 210 may be augmented by one or more applications, such as the applications discussed in FIG. 1. In some embodiments the content provider may have an augmentation plugin, such as augmentation plugin 132 of FIG. 1, which augments the content. Actuatable elements 311-315 may accentuate text to indicate to the user that the subject of the accentuated text may be purchased. In some embodiments, actuatable elements 311-315 may be constructed to seamlessly integrate with the textual content by maintaining some, all, and/or most of the original typography. Although in this example text is accentuated by a rectangular outline, other methods of accentuation may be implemented including, but not limited to, highlighting, underlining, bolding, italicizing, creating hyperlinks, and/or the like. In some examples, the actuatable elements may be seamlessly integrated with the content by using the text of the content as an actuatable element. In some examples, the actuatable element may seamlessly integrate with the content by overlaying and/or surrounding the text with a transparent and/or semitransparent image and/or icon.

In some embodiments, content 210 may be augmented to include actuatable elements, such as icons 321-325, that are next to portions of content 210 which match product identifiers, such as image 212, video 213, portions of text 211, and/or audio payer 214. In some embodiments icons 321-325 may have graphical and/or textual information. In some examples, the graphical and/or textual information of icons 321-325 may be a company name, company symbol, image of a mascot, trade name, trade mark, and/or the like. In some embodiments icons 321-325 may display a symbol or text that identifies the payment provider, merchant, and/or marketplace that is associated with the content augmentation.

In some embodiments actuatable elements 311-325 may be links that map to a merchant selling a product related to the augmented content. For example, actuatable element 311 may map to a merchant selling a product named "Samuson 900." Similarly actuatable element 322 next to video 213 may also map to a merchant selling a Samuson 9000.

Content 200 may feature more than one product with related actuatable elements. For example, actuatable element 312 may link and/or map to a merchant selling a "Pear n7"; actuatable element 313 may link and/or map to a merchant licensing "robot OS" software; actuatable elements 314 and 323 may link and/or map to a merchant selling a "S900 indestructible case;" actuatable element 315 and 324 may link and/or map to a merchant selling a "Melkin Bluetooth speak;" and actuatable element 325 may link and/or map to a merchant that sells and/or licenses "Enjoyable music."

In some embodiments, the content and/or the application may be augmented to contain a master button 330 that may serve multiple purposes. In some embodiments, master button 330 may be integrated with the application used for viewing content 210. For example, master button 330 may be integrated into a tool bar of a web browser. In some embodiments, master button 330 may be an actuatable element integrated with content 210. In some embodiments, master button 330, when activated by a user, may list out products referenced within the content which the user may purchase. Additionally, actuatable element 330 may provide the user with a user interface for setting up user preferences, selectable check boxes next to factors for what merchants are chosen for product purchases.

In some embodiments, when one or more of the actuatable elements 311-330 are activated by a user, a window that overlays the content may appear. The overlay may provide the user the opportunity to purchase a product from a merchant linked with and/or mapped to the actuatable element.

Figure 4:
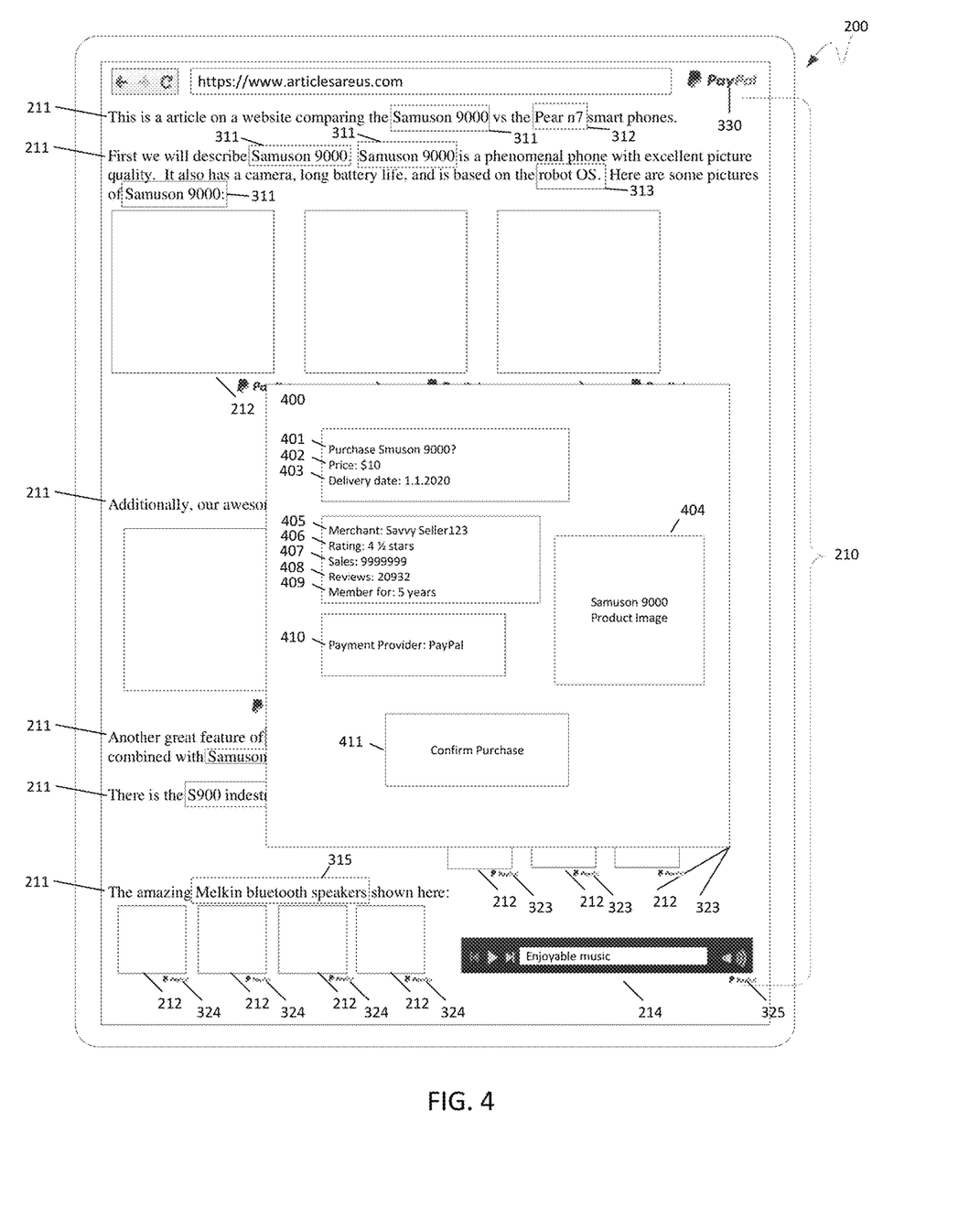
FIG. 4 illustrates an overlay that may appear over the content when an actuatable element of FIG. 3 is actuated.

FIG. 4 illustrates an overlay 400 that may appear over content 210 of FIG. 3 when one or more actuatable elements, such as actuatable elements 311-330 of FIG. 3, are activated by the user.

In some embodiments, overlay 400 may be a window, a dialog, and/or a graphical user interface displayed on a user device, such as user device 140 of FIG. 1, overlaying over content 210. Overlay 400 may be a GUI window that details a product available for purchase and the ability to buy the product. In some embodiments, overlay 400 may display the product name and/or description 401, the price of the product 402, an estimated delivery date 403, and/or the like.

Overlay 400 may also include various images corresponding to products, merchants, and/or payments providers, such as an image 404.

Overlay 400 may also display information about the merchant offering to sell the product. Overlay 400 may provide the merchant's username 405, user ratings 406, number of sales 407, number of reviews 408, membership term 409, and/or the like. In some embodiments, overlay 400 may include other information, such product specifications, product descriptions, product details, and/or the like.

In some embodiments, multiple merchants may be displayed, and the user may be able to choose which merchant the user would like to purchase the product from. In some embodiments, the merchant that is displayed may be based on a user preference. The user preference may be automatically determined through analysis of a purchase history for the user. For example, the user may typically make purchases from the highest rated merchant and/or the user may have set a preference, such as "display merchant with the lowest price."

Overlay 400 may also display the payment provider 410 that will be used if the user chooses to purchase the product using overlay 400. The user may be provided with the option to change the payment provider to other payment options, such as payment by credit card, payment by another provider, and/or the like. Additionally, the overlay may provide an actuatable element 411 for the user to actively purchase the product featured in overlay 400. In some embodiments, actuatable element 411 may be a check out button, such as a checkout with PayPal® button.

Figure 5:
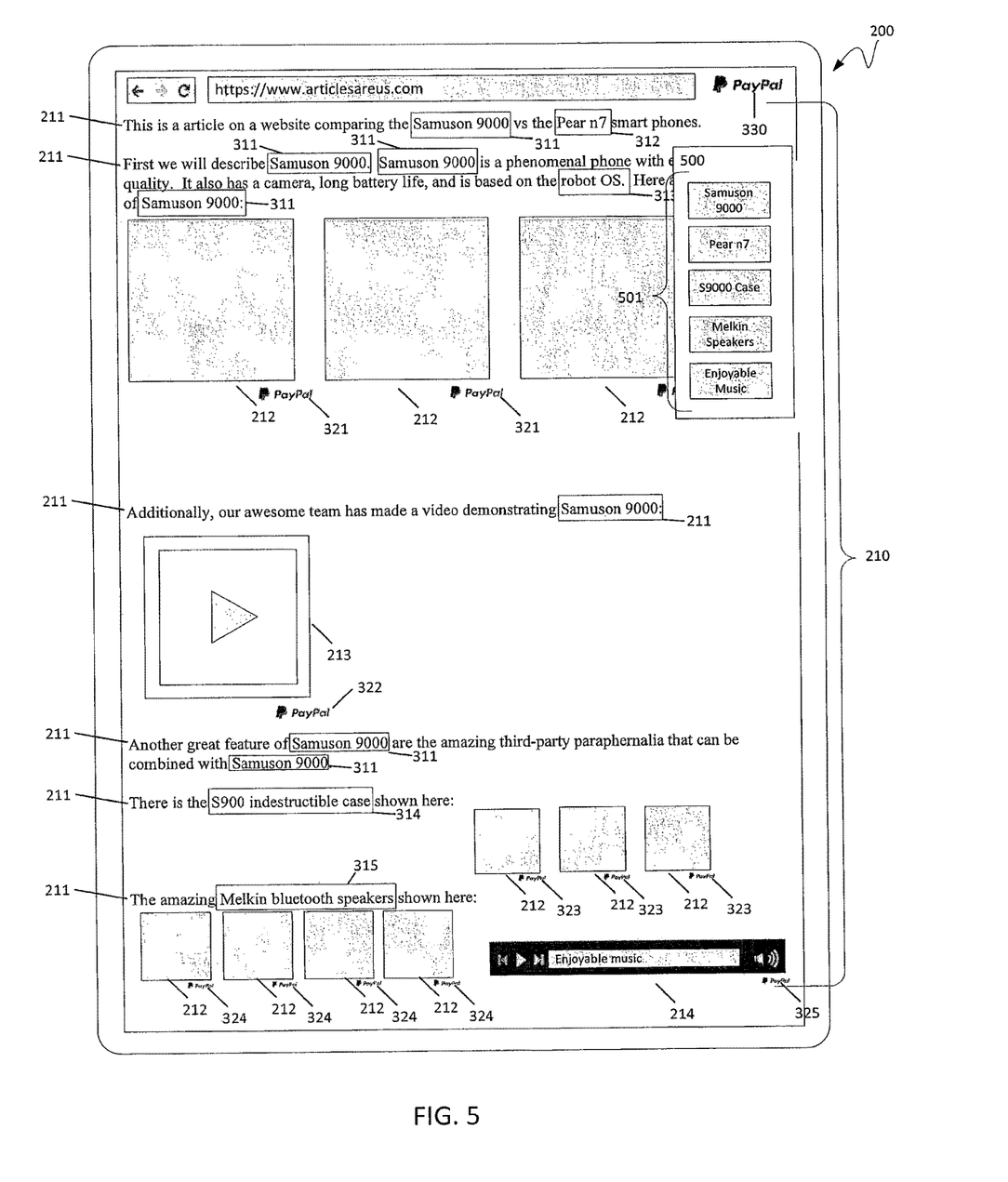
FIG. 5 illustrates an overlay that may appear over the content when a master button of FIG. 3 is actuated.

FIG. 5 illustrates an overlay 500 that may appear over content 210 of FIG. 3 when a master button, such as master button 330 of FIG. 3, is activated by the user. Overlay 500 may display one or more actuatable elements 501 for each product referenced in content 210. In some embodiments, when one or more of actuatable elements 501 are activated by a user, another overlay, such as overlay 400 of FIG. 4, may be displayed, which allows the user to purchase the product that the actuatable element links and/or is related to.

Figure 6:
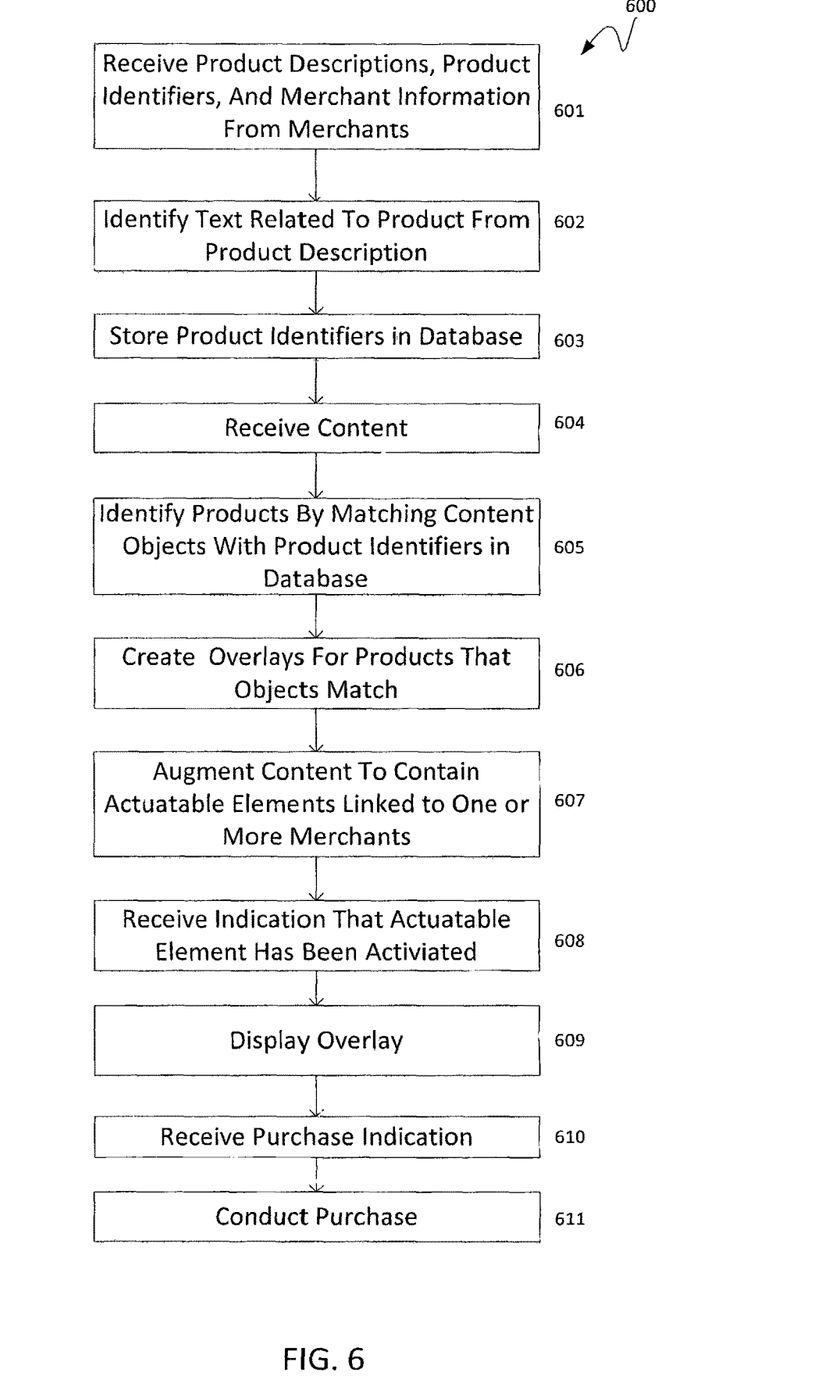
FIG. 6 is a flowchart showing an illustrative process for augmenting content according to an embodiment.

FIG. 6 is a flowchart showing a process for augmenting content for display on a user device according to an embodiment. This process may be handled by one or more applications on one or more devices such as user device 140, merchant server 110, and/or payment provider server 120 of FIG. 1.

At process 601, product descriptions and merchant information is received from one or more merchants via a communication module such as advertising application 113, augmentation plugin 132, application plugin 143, augmentation application 146, and/or the like of FIG. 1. The product descriptions may come in the form of textual data that may include textual product identifiers such as a product name, trade name, manufacturer name, serial numbers, barcodes, and/or keywords and/or phrases that identify and/or uniquely identify the product. The received product identifiers may also include image data, video clip data, audio clip data, and/or other information data that are related to the product.

The merchant information may include data representing a merchant's username, location, address, ratings, membership length with one or more marketplaces, past costumers, products for sales, prices for products sold by the merchant, name, account numbers, preferred payment providers and/or other information about the merchant.

The received product descriptions, product identifiers, and/or merchant information may be stored in a database, such as database 112 of FIG. 1.

In some embodiments the product description received at process 601 may include textual sentences and paragraphs which include commonly used words unrelated to the product. At process 602 a module for processing the text may be used to separate the commonly used words from text that identifies the product. Process 602 may use a module, such as a natural language processor, to identify uncommon words and/or phrases as product identifiers. In some embodiments, process 602 may have a database of common words, such as a dictionary, for eliminating words unrelated to a product. In some embodiments, the product descriptions received from a merchant may be in the form of a list, the list containing keywords and/or phrases that relate to the product, in which case, process 602 may be skipped.

At process 603, the product identifiers may be stored in a database that link to the related product. In some embodiments, the product identifiers may be stored in a database which allows for a matching algorithm to efficiently match received objects with the product identifiers. In some embodiments, product identifiers may be categorized and grouped by the product identifier data format. For example, text, images, and video data. In this manner, process 603 may avoid attempting to match textual objects with a product identifier that is an image. In some embodiments product identifiers may be attached to a number or value that matches a number or value for a product, such as an ISBN, UPC, and/or similar code. In this manner the product may be grouped with product identifiers that identify the product.

At process 604, a communications module, such as merchant server 110 may receive a copy of the content that a user is browsing on a user device, such as user device 140. In some embodiments, the content may be from a website the user is browsing. The content may be in the form of html, XML, java script, python, and/or any other programming code. Merchant server 110 may also receive and or retrieve user information, such as the user's mailing address, preferences, browsing data, purchasing history, and/or other information about the user. The user information may be retrieved from a database such as database 122, and/or from payment provider server 120.

At process 605, a product matching module, such as advertising application 113, augmentation plugin 132, application plugin 143, augmentation application 146, and/or the like of FIG. 1, may identify products referenced within the content by matching objects within the received content with the product identifiers in the database. Process 605 may conduct word and/or phrase matching, keyword searches, image matching, video matching, and/or audio matching between objects within the content and the product identifiers. In some embodiments, a content provider may limit the augmentations made to their content. For example, the content provider may be able to instruct the product matching module, such as augmentation plugin 132, to limit, remove, and/or prevent product identifiers for certain products from matching with objects in the content. The content provider may have a contract with a company which prevents advertisements of a competing product. The content provider may provide the product module a list of products, companies, and/or the like that the product module may cross reference to prevent certain product identification matches for the content of that content provider. In this manner, a content provider may be able to choose how their content is augmented, and what products may be linked to the content.

At process 606, an overlay creation module, such as advertising application 113, augmentation plugin 132, application plugin 143, augmentation application 146, and/or the like of FIG. 1, may create overlays, such as overlay 400 of FIG. 4 and/or overlay 500 of FIG. 5 for objects that are matched at process 605. The overlays may be created by plugging in images, text, video, and or other content into a program file with html, XML, java script, python, and/or other programming languages. For example, one or more programming files may include predetermined programming code by one or more programming languages for instructing a web browser to display a graphical user interface or framework, such as overlay 400 of FIG. 4. The programming files may have empty fields for the overlay creation module to fill in, such as text for the product name 401, price 402, link to an image 404, links for purchasing the product from a merchant 411, links to servers, and or the like. The overlay creation module may retrieve information pertaining to the products, merchant information, payment provider information, links, and/or the like related to the products that were matched to content objects at process 605. The information may be retrieved from a database, such as database 112 of FIG. 1. In some embodiments the overlay creation module may retrieve user information, such as the user's mailing address, preferences, browsing data, purchasing history, and/or other information about the user. The user information may be retrieved from a database such as database 122, and/or from payment provider server 120. The overlay creation module may plugin the information to the corresponding empty fields of the programming files. The information may include information about one or more identified products, merchants selling the product, and/or payment methods (e.g. payment provider, credit card, debit card, gift card, and/or the like). In some embodiments, there may be multiple merchants selling the product, and overlay creation module may pick the merchant for display and/or the order in which a merchant is displayed based on the user information. For example, creation module may pick merchants located closest to the mailing address for the user when populating an empty field in one or more programming files.

At process 607, method 600 may augment the content the user is viewing on a user device with an augmentation module, such as augmentation plugin 132, application plugin 143, and or augmentation application 146 of FIG. 1, to contain actuatable elements that, when activated, display the overlay created at process 606. In some examples, the content may be in the form of html, XML, java script, python, and/or any other programming code, and the augmentation module may augment the content by editing the code to include hyperlinks, overlaying images that are hyperlinks, and/or icons that are hyperlinks. In some embodiments, just the portion of the content with objects related to the product may be augmented by changing the objects into hyperlinks. In some embodiments, the content may be augmented such that a transparent, partially transparent, and/or opaque overlay that acts as an actuatable element may be placed over or proximally to the object in the content. In some embodiments, a displaying module, such as augmentation plugin 132, marketplace application 114, and/or application plugin 143 of FIG. 1, may instruct for the augmented content to be displayed on the user device instead of the original content.

At process 608, method 600 may receive from the user device an indication, such as an electronic signal, that one or more actuatable elements in the augmented content have been activated.

At process 609, in response to the indication at process 608, the overlay created at process 606 may be displayed on top of the content being viewed by the user. The overlay may include an actuatable element that the user may activate to have the user device send a purchase indicator. In some embodiments, the actuatable element may be a one-click payment button that sends a purchase indicator from the user device when clicked (e.g., clicked using, for example, a user's finger on a touch screen and/or through one or more I/O devices).

At process 610, method 600 may receive a purchase indicator from the user device which initiates the purchase of a product from a merchant.

At process 611, method 600 may, in response to receiving a purchase indicator, instruct a payment provider server, such as payment provider server 120 of FIG. 1, to transfer funds from an account (e.g., a bank account, credit card account, or other financial account) of the user to an account of the merchant. This may include a funds exchange, email confirmation, and/or the like. In this manner, a product may be purchased within the content without the user having to leaving the content.

Figure 7:
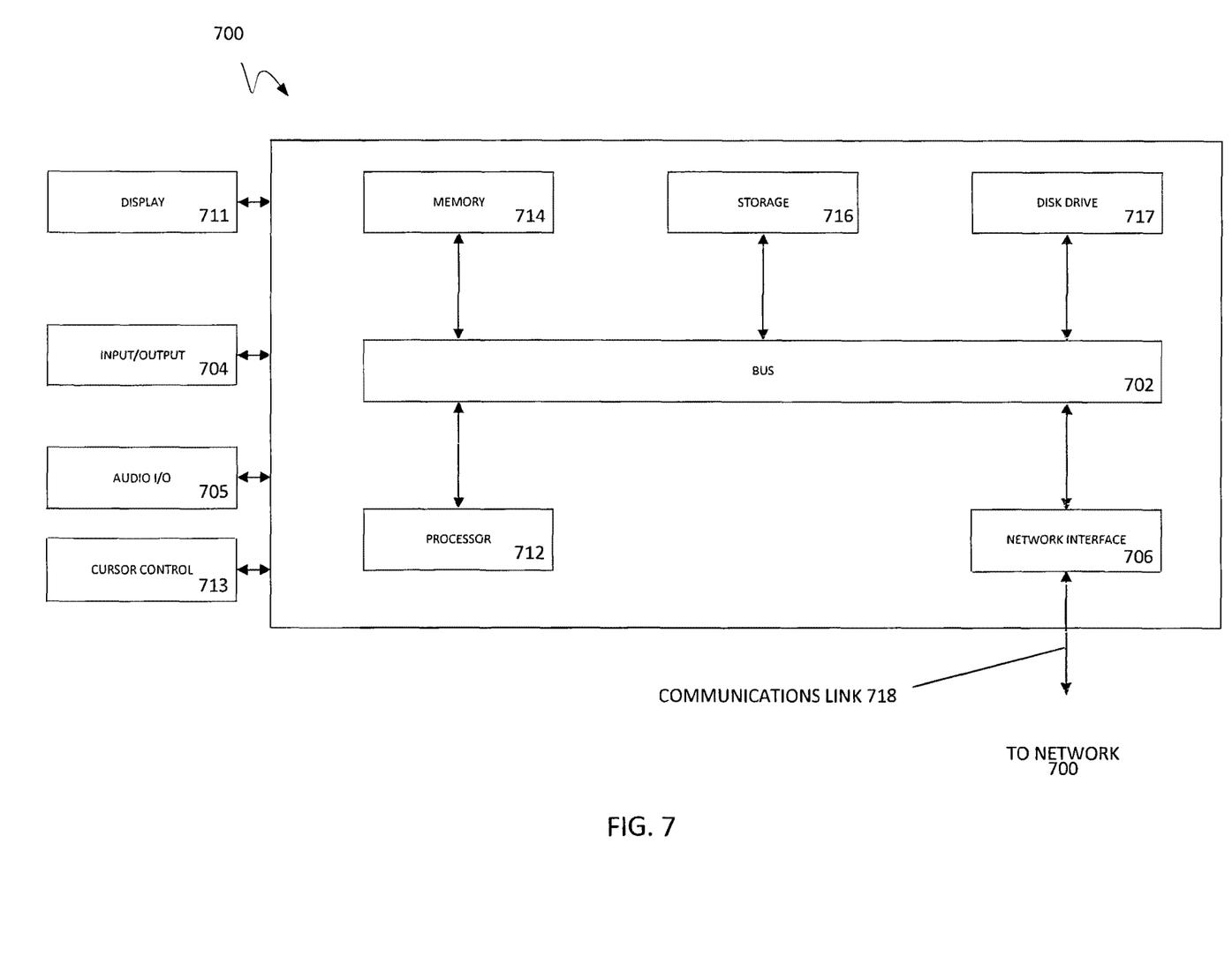
FIG. 7 is a block diagram of an illustrative computer system suitable for implementing one or more components in FIG. 1 according to an embodiment.

FIG. 7 is a block diagram of a computer system 700 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant, third-party server, and/or payment provider may utilize a network computing device (e.g., a network server) capable of communicating with the network. It should be appreciated that each of the devices utilized by users, merchants, and payment providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another user device, a merchant server, or a payment provider server via network 160. In one embodiment, the transmission is wireless, although other transmission mediums and methods may also be suitable. A processor 712, which can be a micro-controller, digital signal processor (DSP), or other processing component, processes these various signals, such as for display on computer system 700 or transmission to other devices via a communication link 718. Processor 712 may also control transmission of information, such as cookies, IP addresses, and/or instructions to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or electromagnetic waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
analyzing electronic media content accessed by a device;
identifying, based on the analyzing, displayable content within the electronic media content that corresponds to a product;
generating an actuatable element for the displayable content based on typographical characteristics of the displayable content, wherein the actuatable element is generated to include at least one or more of the typographical characteristics of the displayable content;
in response to the identifying the displayable content that corresponds to the product, modifying the electronic media content, wherein the modifying comprises inserting code for the actuatable element into the electronic media content, wherein when the modified electronic media content is rendered on a user interface of the device, the displayable content is replaced by the actuatable element and the actuatable element is actuatable to cause the device to navigate to a corresponding electronic resource having additional information about the product;
causing the modified electronic media content to be rendered on the user interface;
detecting that a transaction associated with the product has been completed via the corresponding electronic resource; and
in response to detecting that the transaction has been completed, updating the modified electronic media content, wherein the updating comprises replacing the actuatable element with the displayable content.

2. The system of claim 1, wherein the operations further comprise:
receiving, via the user interface, an actuation of the actuatable element; and
causing, upon the receiving the actuation of the actuatable element, the device to navigate to the corresponding electronic resource.

3. The system of claim 2, wherein the causing the device to navigate to the corresponding electronic resource comprises launching a window that displays data of the corresponding electronic resource.

4. The system of claim 2, wherein an execution of the code for the actuatable element causes a pop-up window to be rendered on the modified electronic media content.

5. The system of claim 4, wherein the updating the modified electronic media content further comprises: removing the pop-up window.

6. The system of claim 1, wherein the corresponding electronic resource includes a merchant webpage that offers the product for sale.

7. The system of claim 1, wherein the transaction is a purchase of the product on a merchant webpage that offers the product for sale.

8. The system of claim 1, wherein the actuatable element comprises a link corresponding to a merchant webpage.

9. The system of claim 1, wherein the electronic media content comprises at least one of text data, audio data, image data, or video data.

10. A method comprising:
analyzing, by a computer system, electronic media content obtained by a device;

identifying, based on the analyzing, displayable content corresponding to a product within the electronic media content;
generating an actuatable element for the displayable content based on typographical characteristics of the displayable content, wherein the actuatable element has at least one or more of the typographical characteristics of the displayable content;
modifying, by the computer system, the electronic media content, wherein the modifying comprises replacing the displayable content with the actuatable element, wherein the actuatable element is actuatable to cause the device to navigate to an electronic resource having additional information about the product;
causing the modified electronic media content to be rendered on a user interface of the device;
detecting, by the computer system, that a transaction associated with the product has been completed via the electronic resource; and
in response to detecting that the transaction has been completed, updating, by the computer system, the modified electronic media content, wherein the updating comprises replacing the actuatable element with the displayable content.

11. The method of claim 10, further comprising:
receiving, via the user interface, an actuation of the actuatable element; and
causing, upon the receiving the actuation of the actuatable element, the device to navigate to the electronic resource.

12. The method of claim 11, wherein the causing the device to navigate to the electronic resource comprises launching a browser window that displays data associated with the electronic resource.

13. The method of claim 10, wherein the modifying further comprises rendering an icon on the modified electronic media content in a position adjacent to the actuatable element.

14. The method of claim 13, wherein the icon comprises at least one of graphical information or textual information.

15. The method of claim 10, wherein the electronic resource includes a merchant webpage that offers the product for sale.

16. The method of claim 10, wherein the electronic media content comprises at least one of text data, audio data, image data, or video data.

17. A non-transitory machine-readable medium having stored thereon machine-readable instructions executable to cause a machine to perform operations comprising:
analyzing electronic media content accessible by a device;
identifying, based on the analyzing, displayable content within the electronic media content that corresponds to a product;
generating a selectable element for the displayable content based on typographical characteristics of the displayable content, wherein the selectable element is generated to include at least one or more of the typographical characteristics of the displayable content;
modifying the electronic media content, wherein the modifying comprises inserting code for the selectable element into the electronic media content, wherein when the modified electronic media content is rendered on a user interface, the displayable content is replaced by the selectable element and the selectable element is selectable to cause the device to navigate to a corresponding electronic resource having additional information about the product;
causing the modified electronic media content to be rendered on a user interface of the device;
detecting that a transaction associated with the product has been completed via the corresponding electronic resource; and
in response to detecting that the transaction has been completed, updating the modified electronic media content, wherein the updating comprises replacing the selectable element with the displayable content.

18. The non-transitory machine-readable medium of claim 17, wherein the operations further comprise:
receiving, via the user interface, a selection of the selectable element; and
causing, upon the receiving the selection of the selectable element, the device to navigate to the corresponding electronic resource.

19. The non-transitory machine-readable medium of claim 17, wherein the causing the device to navigate to the corresponding electronic resource comprises opening a browser window that displays data of the corresponding electronic resource.

20. The non-transitory machine-readable medium of claim 19, wherein the updating the modified electronic media content further comprises: closing the browser window.

* * * * *